United States Patent
Gandolph et al.

(10) Patent No.: US 7,949,958 B2
(45) Date of Patent: May 24, 2011

(54) METHOD AND APPARATUS FOR GENERATING AN ELECTRONIC MENU

(75) Inventors: Dirk Gandolph, Ronnenberg (DE); Jobst Hoerentrup, Hannover (DE); Ralf Ostermann, Hannover (DE); Hartmut Peters, Barsinghausen (DE); Carsten Herpel, Wennigsen (DE)

(73) Assignee: Thomson Licensing, Boulogne Billancourt (FR)

( * ) Notice: Subject to any disclaimer, the term of this patent is extended or adjusted under 35 U.S.C. 154(b) by 266 days.

(21) Appl. No.: 10/584,649

(22) PCT Filed: Nov. 22, 2004

(86) PCT No.: PCT/EP2004/013244
§ 371 (c)(1),
(2), (4) Date: Jun. 26, 2006

(87) PCT Pub. No.: WO2005/069303
PCT Pub. Date: Jul. 28, 2005

(65) Prior Publication Data
US 2007/0192746 A1 Aug. 16, 2007

(30) Foreign Application Priority Data
Jan. 5, 2004 (EP) ..................................... 04000056

(51) Int. Cl.
*G06F 3/048* (2006.01)
(52) U.S. Cl. .................... 715/810; 715/764; 715/765
(58) Field of Classification Search .................. 715/810, 715/764, 765
See application file for complete search history.

(56) References Cited

U.S. PATENT DOCUMENTS

| 5,659,793 | A  | * | 8/1997  | Escobar et al. | 715/202 |
| 7,191,411 | B2 | * | 3/2007  | Moehrle | 715/855 |
| 7,679,744 | B2 | * | 3/2010  | Yamagaki et al. | 356/364 |
| 2001/0052127 | A1 | | 12/2001 | Seo et al. | |
| 2002/0013944 | A1 | * | 1/2002  | Gordon et al. | 725/39 |
| 2002/0041292 | A1 | * | 4/2002  | Son et al. | 345/810 |
| 2002/0101459 | A1 | * | 8/2002  | Herle et al. | 345/866 |
| 2003/0227474 | A1 | * | 12/2003 | Oetzel et al. | 345/716 |
| 2004/0012382 | A1 | * | 1/2004  | Fender et al. | 324/121 R |
| 2007/0248333 | A1 | * | 10/2007 | McCrossan et al. | 386/124 |

FOREIGN PATENT DOCUMENTS

WO    WO 00/63916    10/2000

OTHER PUBLICATIONS

Search Report Dated Feb. 22, 2005.

* cited by examiner

*Primary Examiner* — Doug Hutton
*Assistant Examiner* — Soumya Dasgupta
(74) *Attorney, Agent, or Firm* — Robert D. Shedd; Joseph J. Opalach; Reitseng Lin

(57) ABSTRACT

Optical disc players are today connectable to the Internet, and may contain local storage capability, e.g. HDD. Additional post-production content can be downloaded and locally stored. It is difficult to include downloaded additional post-production material in menus for keeping a menu always consistent with the actually available data. Ideally, the menu should reflect the available data even if certain content is deleted or replaced with e.g. another version. A 'linked-list' approach for menu pages generates a dynamic menu structure. The menu consists of basic menu pages, which are retrieved from the disc, and additional pages that are downloaded together with the additional content. Page ranges may be reserved for e.g. audio, video or subtitles. The linked-list is implemented by an implicit link from each page to the next higher or lower page number.

17 Claims, 16 Drawing Sheets

METHOD AND APPARATUS FOR GENERATING AN ELECTRONIC MENU

This application claims the benefit, under 35 U.S.C. §365 of International Application PCT/EP2004/013244, filed Nov. 22, 2004, which was published in accordance with PCT Article 21(2) on Jul. 28, 2005 in English and which claims the benefit of European patent application No. 04000056.4, filed Jan. 5, 2004.

FIELD OF THE INVENTION

This invention relates to a method and an apparatus for generating an electronic menu. In particular, the invention relates to a method and an apparatus for generating an electronic menu that may be adapted automatically to dynamically changing audio-visual (AV) content.

BACKGROUND

Advanced optical disc systems like pre-recorded Blu-ray disc (BD-ROM) may reinforce interactivity as a further added value for consumers. Instruments, or players, may comprehend standardized equipment for Internet connectivity and local storage availability, such as e.g. a hard-disk drive (HDD). Such equipment provides content adaptation on a post-production basis, i.e. AV content on the optical disc may be supplemented, modified and/or updated by Internet and/or locally stored data. These data may have an identifier associated that defines to which content or medium they relate.

Removable storage media for audio-visual (AV) content usually contain data for generating a menu that is suitable for presenting an overview of the AV content to a user. When post-production menus shall present all available AV content relating to a removable storage medium, on and off the medium itself, a dynamic adaptation of the menu is required. As a further complication, complementary supplement data sets that belong to different generations with respect to their download date or release date may reside on a local storage and should all be involved in a menu, while still the menu should have a homogenous appearance to the user.

SUMMARY OF THE INVENTION

For BD-ROM a system is defined that allows the download of additional dynamic content, such as e.g. further audio or subtitle streams. These may supplement, modify and/or update the original disc content. This dynamic content may be delivered via Internet and/or local storage, and will often be independently generated at a time when the related optical disc content is already released. Nevertheless, for the selection of content a user demands having a menu that includes all content that is available, no matter where it might be stored.

Thus, the problem to be solved by this invention is to generate automatically an electronic menu for AV content, wherein the AV content comprises content items that are retrievable from an optical disc and other content items that are retrievable from another storage medium, e.g. a HDD, and wherein the menu may automatically adapt to the available content when content is added or removed. Such method is disclosed in claim 1.

According to the invention, the menu comprises a plurality of menu pages that are linked like a "daisy chain". Thus, additional menu pages may be linked into the menu that already exists on the optical disc. These additional menus are received together with the additional content and thus are perfectly fitting. Further, if any specific design style is employed for the menu of a medium, the additional menu pages can be created in the same style. When additional content is removed, also the respective menu page is removed from the menu. The invention employs a linking mechanism which allows dynamically adapting to all content additionally available for the player. The invention also copes with changes due to any erasing, adding and/or substitution process being executed on the player's local storage.

An advantage of the invention is its simplicity, which is achieved by avoiding a complex menu decoder, which would be necessary e.g. when describing the content by a mark-up language and reassembling a menu by using a style sheet.

Another advantage of the invention is that it works also when no Internet connection is available, so that it would not be possible to download e.g. an individually adapted menu from an Internet service. Instead, the menu can be generated solely from the available data.

Advantageously, the present invention allows free and unlimited extension of a menu. Neither the number nor the type of additional content items to be presented in the menu needs to be predefined. Further, complementary supplements belonging to different generations, download dates or release dates, can be combined independently. Therefore, it does not require knowledge about the future ideas of the author for providing menus that include all dynamic content. An apparatus that utilizes the method is disclosed in claim 8.

In particular, the present application discloses a method for automatically generating an electronic menu including a plurality of menu pages, wherein each menu page contains selectable menu items with associated commands to be executed upon activation of the respective menu item. The disclosed method comprises associating a page number with each menu page, having a first menu page that contains at least one menu item with an associated command and associated data, wherein the data defines a range of page numbers, and wherein the command associated with the menu item comprises switching to another menu page, detecting the page numbers of the available menu pages, and selecting a second menu page upon activation of said menu item for switching to another menu page, wherein the second menu page has the next or previous page number from among the available menu pages relative to the page number of said first menu page.

The mentioned page number is generally to be understood as an identifier of a displayable portion of the menu, wherein the identifier has a value so that different menu pages can be brought into an ascending or descending order according to the values of their respective identifiers. The method according to the invention comprises detecting for a first menu page which of the other available menu pages has the next higher, or lower, page number, and selecting the respective other menu page upon a specific command. Since this selection can be done at execution time of the menu command, the choices reflect the variety of actually available menu pages, and thus may dynamically change.

In a preferred embodiment, a single authority releases new menu pages, and can therefore assign the corresponding page numbers, so that an overlapping of page numbers can be prevented or enforced. Such authority can be e.g. a content provider or studio.

A device, e.g. menu controller, according to the invention has means for detecting the current menu page number, means for detecting from a request for displaying another menu page the allowed range of page numbers of the next menu page to be displayed, means for detecting which of the available menu pages has the next higher or lower number, and means for selecting said menu page.

The invention also relates to optical storage media. According to the invention, an optical storage medium for storing audio-visual content and menu data for a multi-page menu, wherein menu pages have page numbers, and wherein at least a first menu page contains a command for selecting a second menu page, is characterized in that the command for selecting a second menu page specifies a range of two or more menu pages to select, and a predefined rule specifies which menu page of the range of menu pages is selected next, and further that for several page numbers, at least for one page number, within said range no relating menu page is stored on the optical storage medium. These page numbers can be used for downloaded additional menu pages.

Advantageous embodiments of the invention are disclosed in the dependent claims, the following description and the figures.

BRIEF DESCRIPTION OF THE DRAWINGS

Exemplary embodiments of the invention are described with reference to the accompanying drawings, which show in FIG. 1 a scheme of a BD-ROM menu showing an exemplary audio track selection menu as provided by the original BD-ROM disc.

DETAILED DESCRIPTION OF THE INVENTION

Figure 1:
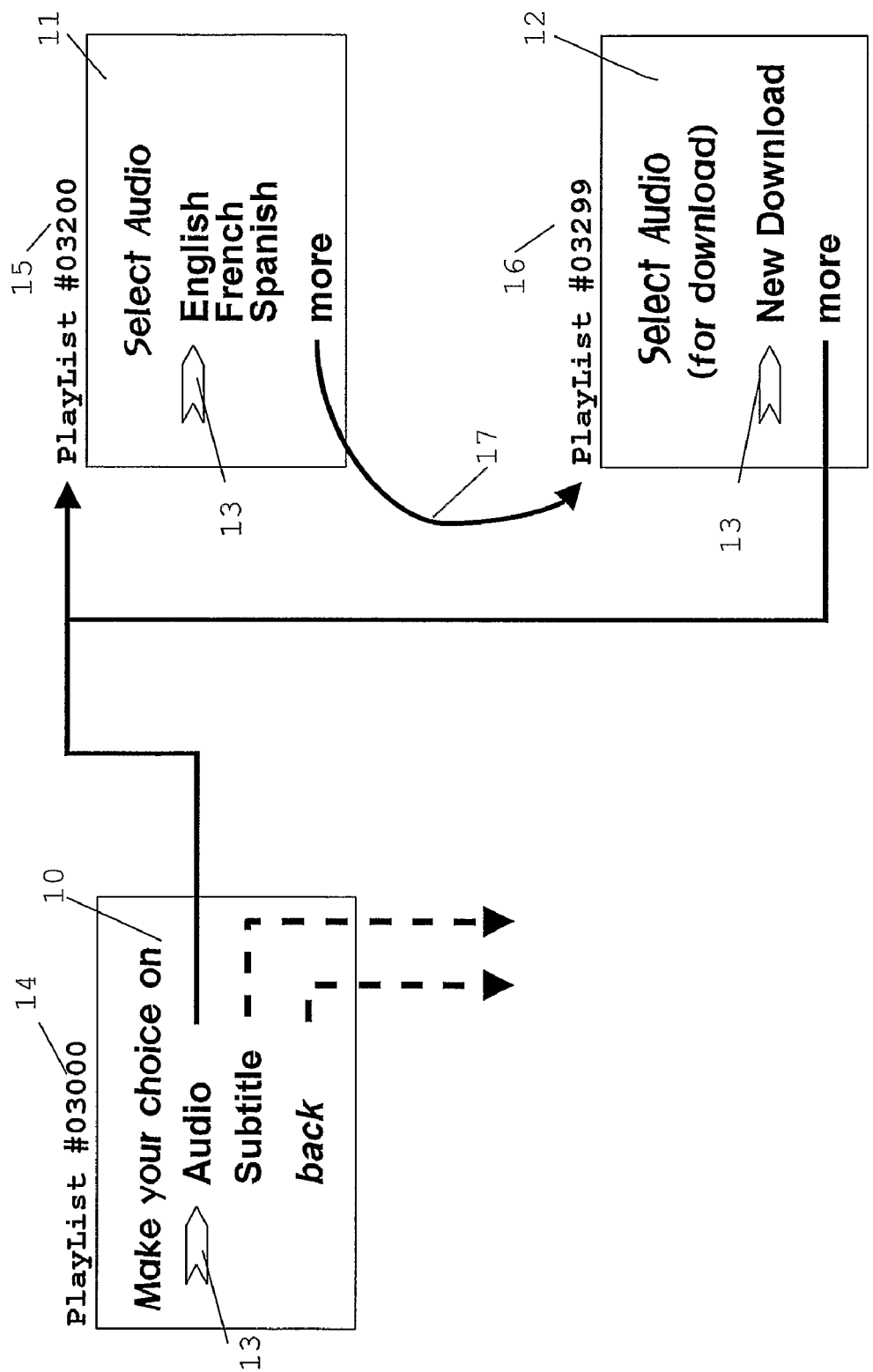

FIG. 1 shows an exemplary scheme of a BD-ROM menu, being an audio track selection menu. For BD-ROM, the controlled access to AV content is organized by playlists, clip information and transport streams. Playlists are stored in playlist files with the file name extension .mpls, clip information is stored in clip information files with the file name extension .clpi, and transport streams are stored in MPEG-2 transport stream files with the file name extension .m2ts.

A transport stream file contains a multiplex of AV streams, including interactive graphical streams for menus. The menus provide navigation for a selection of options that reflect the content available on the disc. A playlist contains information about which transport stream from the multiplex is to be played upon activation of a specific menu item. A playlist may also be composed of two or more play-items. A menu page, i.e. a visible screen page of the menu, may correspond to a playlist or, more often, to a single play-item from a playlist, so that a playlist may contain several menu pages.

A download of supplemental AV material, e.g. an additional audio stream, is done by storing a supplemental playlist file, a supplemental clip information file and a supplemental transport stream file on a local storage. The supplemental files contain e.g. the additional audio stream and the interactive graphical streams for the menu required by the user to make a selection of the new content. By merging the available content on disc with such content available on local storage, a binding is reached by using the inventive supplement content menu linking mechanism.

In FIG. 1, playlist and play-item numbers 14, 15, 16 label every menu frame 10, 11, 12. This is the entry point by which the interactive graphical stream can be found within the transport stream. E.g. the main menu page 10 can be stored in the playlist file "03000.mpls", as indicated in FIG. 1 by the respective playlist and play-item number 14. The other two menu pages 11, 12 may be stored in separate playlist files "03200.mpls" and "03299.mpls", but alternatively also as two different play-items within a single playlist file, e.g. play-items "00" and "99" within the playlist file "03200.mpls".

Figure 2:
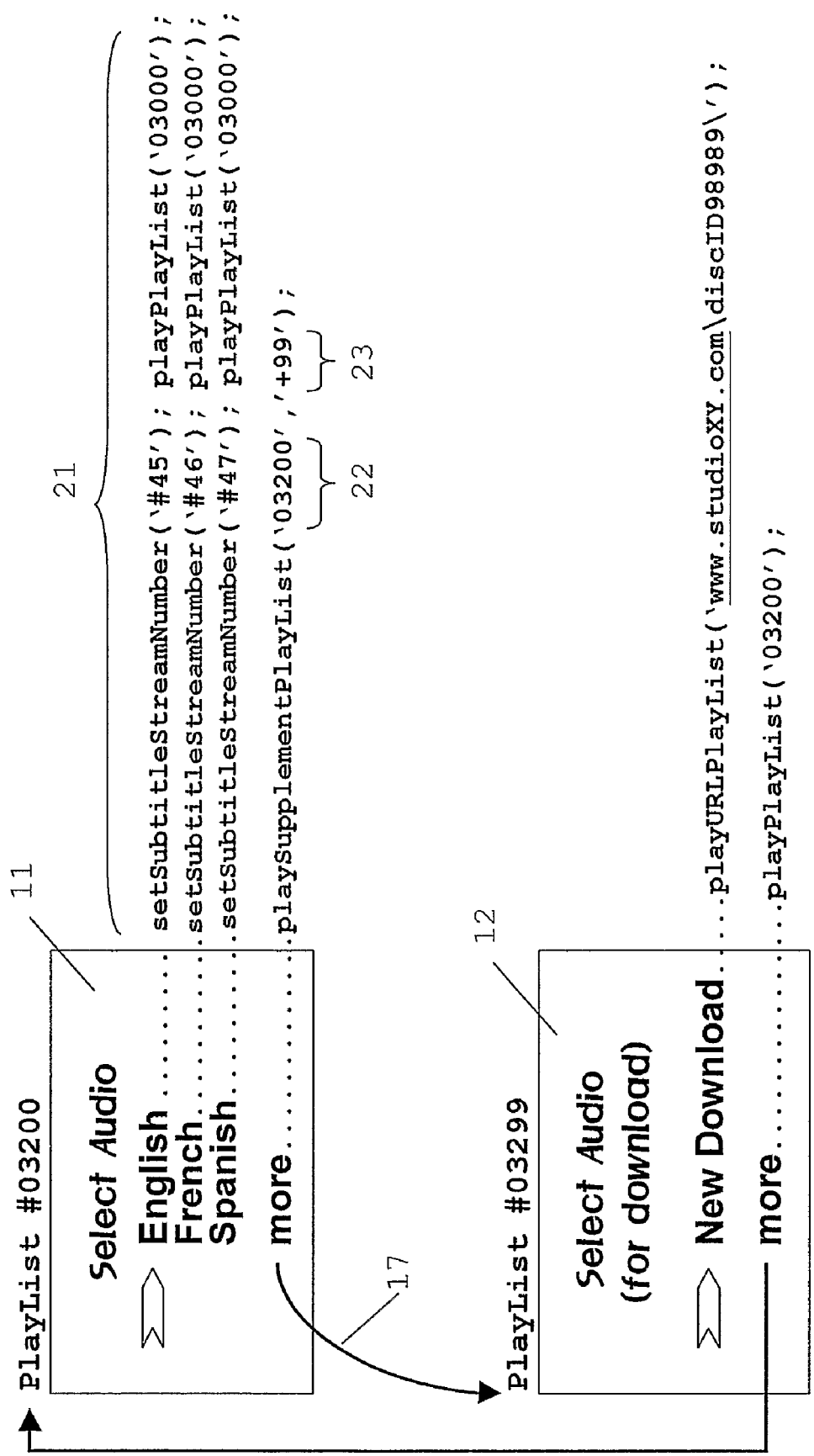
FIG. 2 an excerpt of FIG. 1 showing the commands executed when a menu button is selected and activated, wherein an explicit range link is used and all menus are located on the original BD-ROM disc.

Different buttons with which the user can navigate exist within the menu frames. The arrow 13 within the menu frame indicates that the respective button is currently in the "selected" state. A user can change the button selection to another button via the remote control (RC). If a selected button is activated, one or several commands can be executed, as shown in FIG. 2. All button commands belonging to the menu are embedded within the corresponding clip information file. The commands 21 within this example encompass the setting of an audio stream number and the start of a new playback of a playlist and play-item number. An arrow 17 showing the transition between different menu frames 11,12 symbolizes the start of a new playback.

FIG. 1 and FIG. 2 show the menus contained within the BD-ROM disc medium, i.e. without any supplement data on a local storage. The first audio menu frame 11 provides the three languages to select: English, French and Spanish. The fourth button "more" leads to another menu frame 12, offering "New Downloads" or a return to the beginning of the audio selection. The navigation given here is just an example and not exhaustive. Essential however are the different button commands 21 for playing another playlist or play-item. While the button commands 21 for the audio streams that are already available on disc are composed from a "setSubtitleStreamNumber( )" command followed by a "playPlayList( )" command for menu frame transition, the chaining button "more" uses a "playSupplementPlayList( )" command for frame transition 17. This new linking command is using two parameters, the first 22 for giving a playlist or play-item number and the second 23 for defining a range relative to the first parameter.

This embodiment describes all playlist items lying within the defined range, in the example this is from #03200 till #03299. Equivalently, an explicit range can be given, i.e. '#03200', '#03299', where e.g. the order of parameters defines the search direction.

As a further embodiment of the invention, it is possible to define a positive and a negative range for the second parameter. Likewise, it may appear useful to define additionally a range of page numbers to be excluded.

Figure 3:
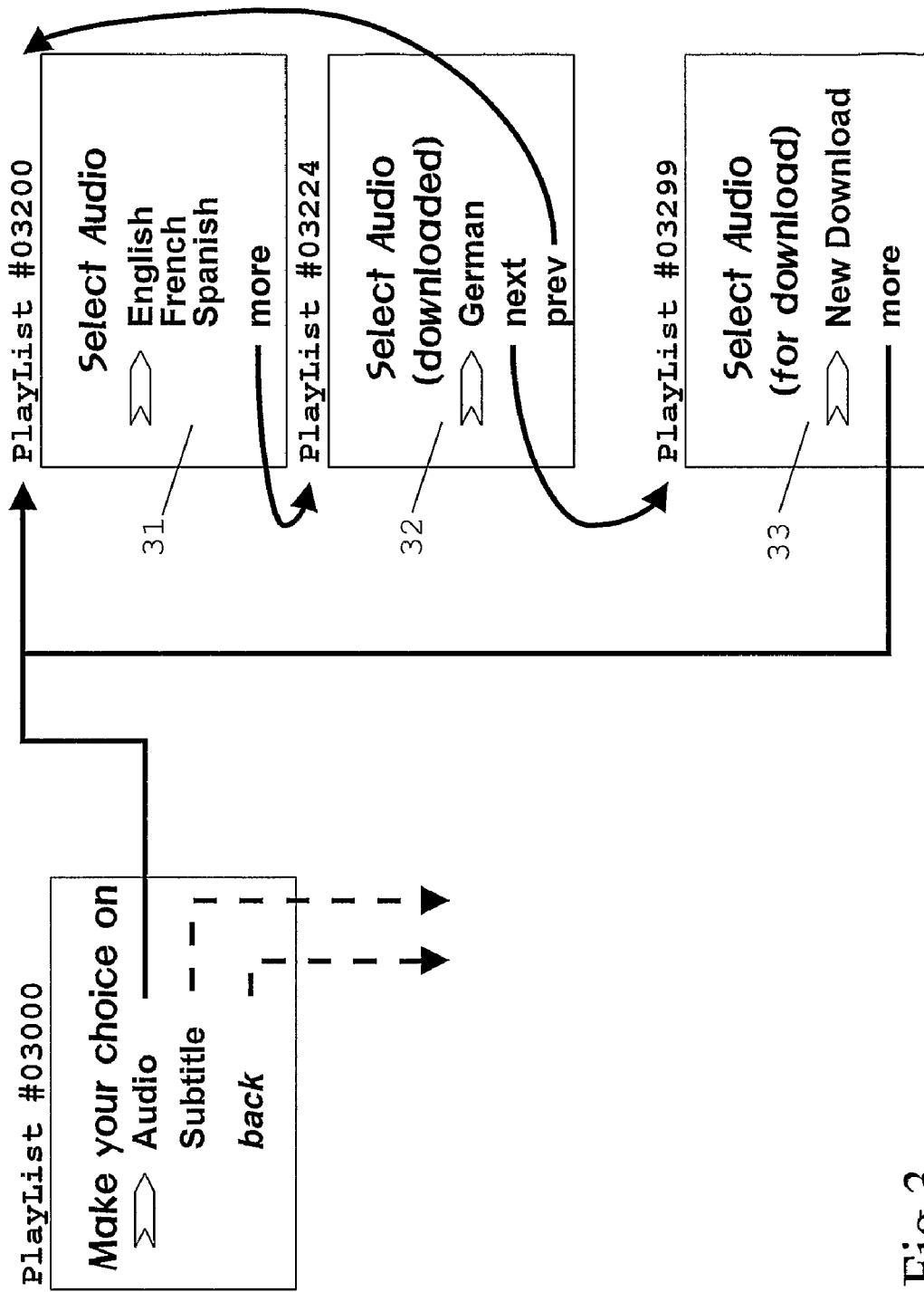
FIG. 3 a scheme of a BD-ROM menu showing the exemplary audio track selection menu, extended by selection menu frames from downloaded supplement data.
Figure 4:
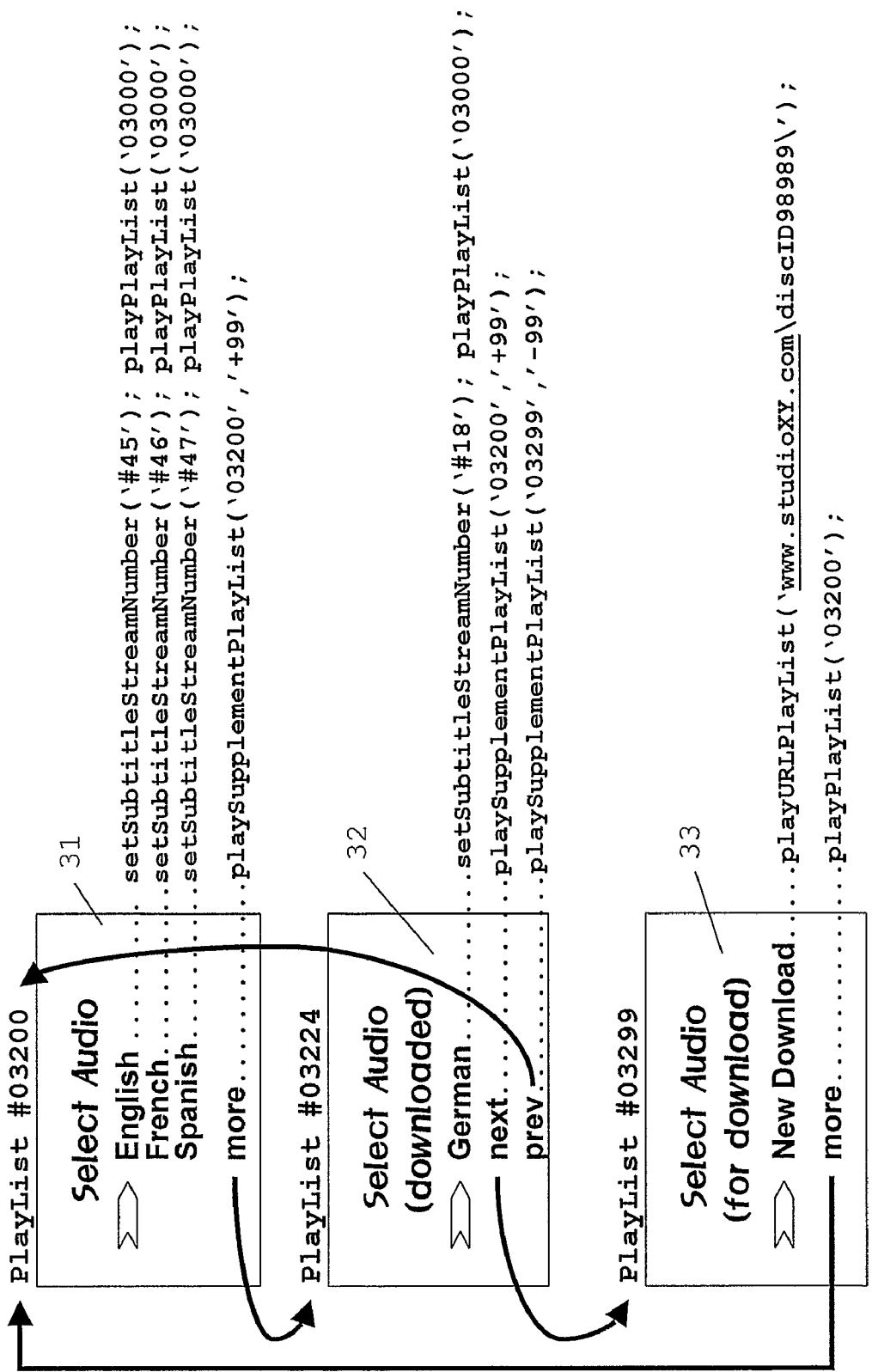
FIG. 4 an excerpt of FIG. 3 showing the commands executed when a menu button is selected and activated.

The function of the range is further clarified in FIG. 3 and FIG. 4. A menu page 32 for downloaded supplement content that has the playlist/play-item number #03224 is present on a local storage. This number lies within the range defined for the "more" button command of a menu page 31 that is stored on the disc and has the playlist/play-item number #03200. The command "playSupplementplayList('03200', '+99')" is associated with the "more" button and defines the range of pages to be displayed. Upon detection of the existence of the downloaded supplement content menu page 32, the button command "playSupplementPlayList('03200', '+99')" associated with the "more" button plays the intermediate playlist/play-item #03224 instead of the playlist/play-item #03299, because its value is closer to the own number #03200.

Moreover, this embodiment also includes a "prev" button on a downloaded menu page, which button can be used to select the previous menu page, i.e. the menu page with the next lower page number. Additionally, such "prev" button could also be added to the last menu page 33, which is a regular menu page stored on the disc.

In one embodiment of the invention only the availability of menu pages is checked, while in another embodiment also the availability of the related AV content may be verified.

Figure 5:
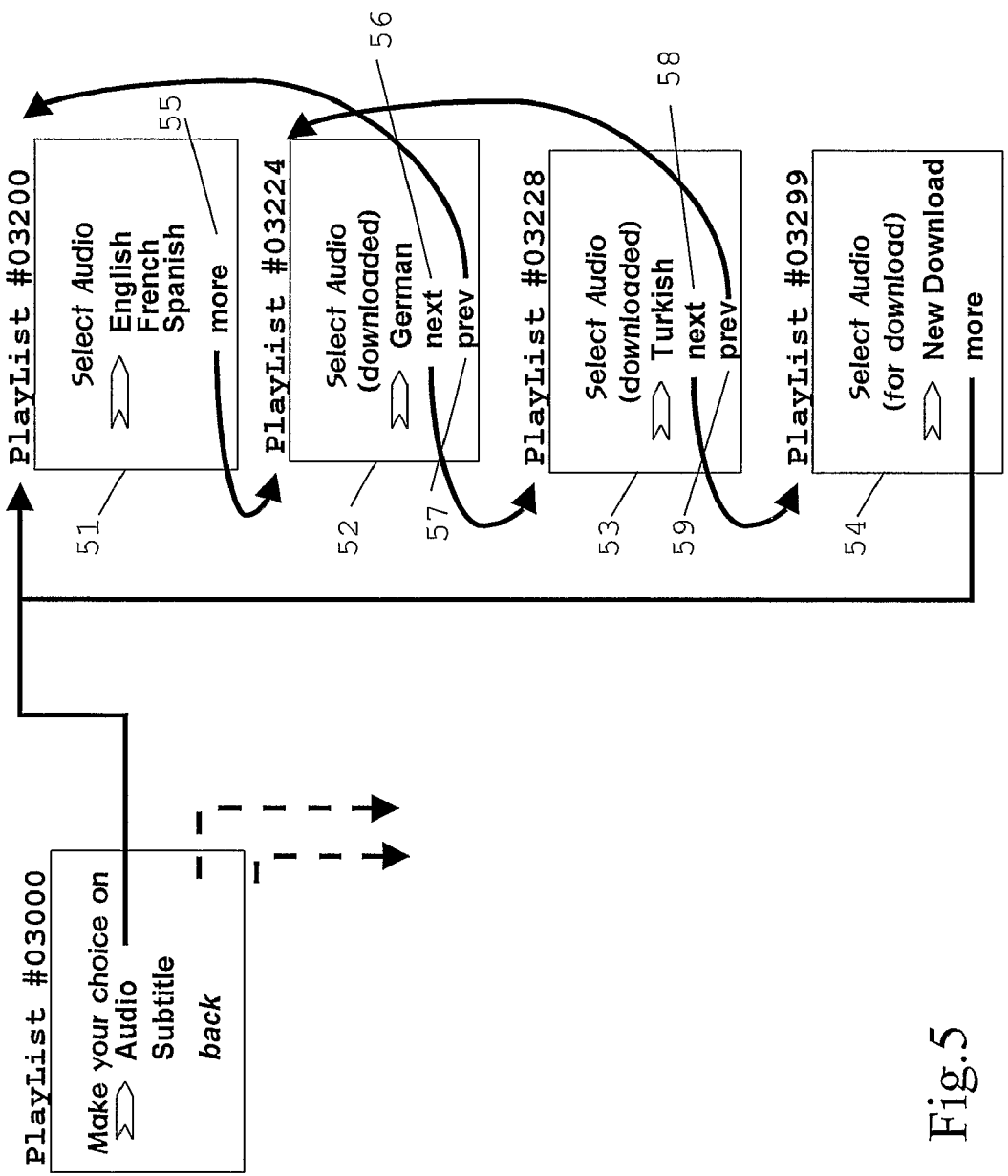
FIG. 5 a scheme of a BD-ROM menu showing the exemplary audio track selection menu, further extended by selection menu frames from further downloaded supplement data.
Figure 6:
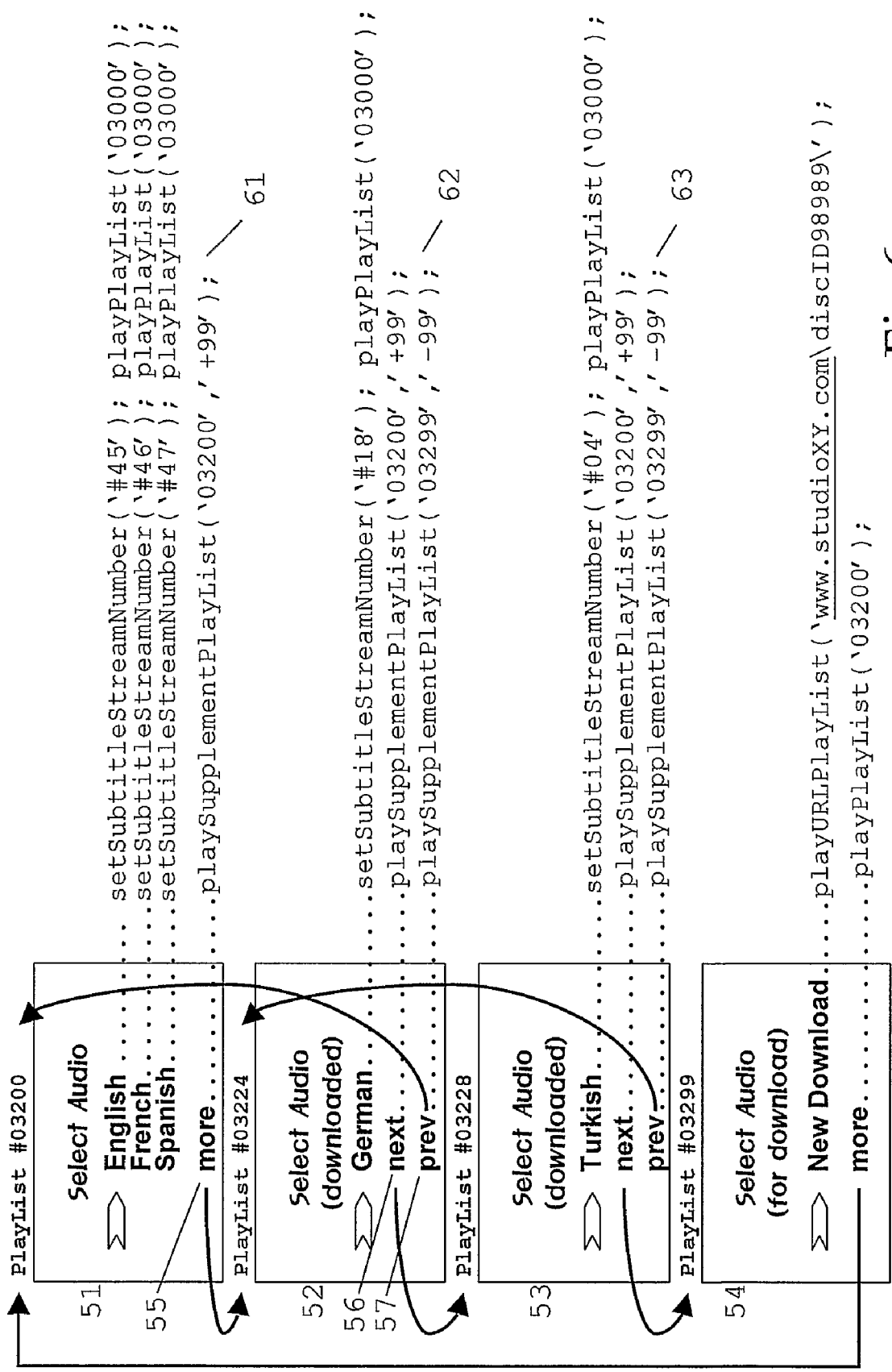
FIG. 6 an excerpt of FIG. 5 showing the commands executed when a menu button is selected and activated.

If further supplement content is downloaded, the described principle is applied successively for all available menu pages, including those for supplement content. This is depicted in FIG. 5 and FIG. 6, where further supplement content has been downloaded. The "more" button commands lead successively through all supplement content available on disc or on local storage. Assuming that the main audio selection menu page 51 is displayed and the user selects and activates the "more" button 55, a menu controller according to the invention detects that the current menu page number is #03200 and that the "more" button command 61 specifies an ascending range from #03200 to #03299 for the next menu page. Then it detects which menu pages are available within this range, and finds the four pages shown in FIG. 5 and FIG. 6, with the associated page numbers #03200, #03224, #03228 and #03299. Starting from the current page number in ascending order, it detects that the next higher page number is #03224, and decodes the respective stream so that finally the contained menu page 52 can be displayed. Other menu pages 52, 53 may display different text, e.g. "next" 56, for the same functionality.

When this page 52 is displayed, and the user selects and activates the "prev" button 57, the menu controller starts from the current page number #03224, detects from the button command 62 that, starting from the current page number, the range from #03299 to #03200 must be searched through in descending order, and detects that the next page to be displayed is #03200.

In another embodiment of the invention, the range may be given by only one parameter, e.g. "playSupplementPlayList ('#03200')", while the current page number is used as the other parameter, and the search direction is found by a comparison of the two parameters. In the given example, when the current page number is #03224 and thus higher than the parameter of the command, the range to be searched is from #03223 down to #03200.

As mentioned above, in the described example the two menu pages 51, 52 could also be two different play-items in the same playlist. In this case both would be stored in the same playlist file with the extension .mpls, and thus no other menu page could be inserted between them.

It is possible in one embodiment of the invention that menu pages that exist on the disc, e.g. #03200 and #03299 as in the mentioned examples, enclose the range of allowed menu pages, or the range can in another embodiment be defined by page numbers of pages that do not necessarily exist. Therefore the range of allowable page numbers needs not necessarily include the current page number. E.g. in FIG. 1 the button command associated with the "Audio" button of the main menu screen 10 may provide the page number of the first audio menu page 15, or alternatively a range specification from #03200 to #03299.

Figure 7:
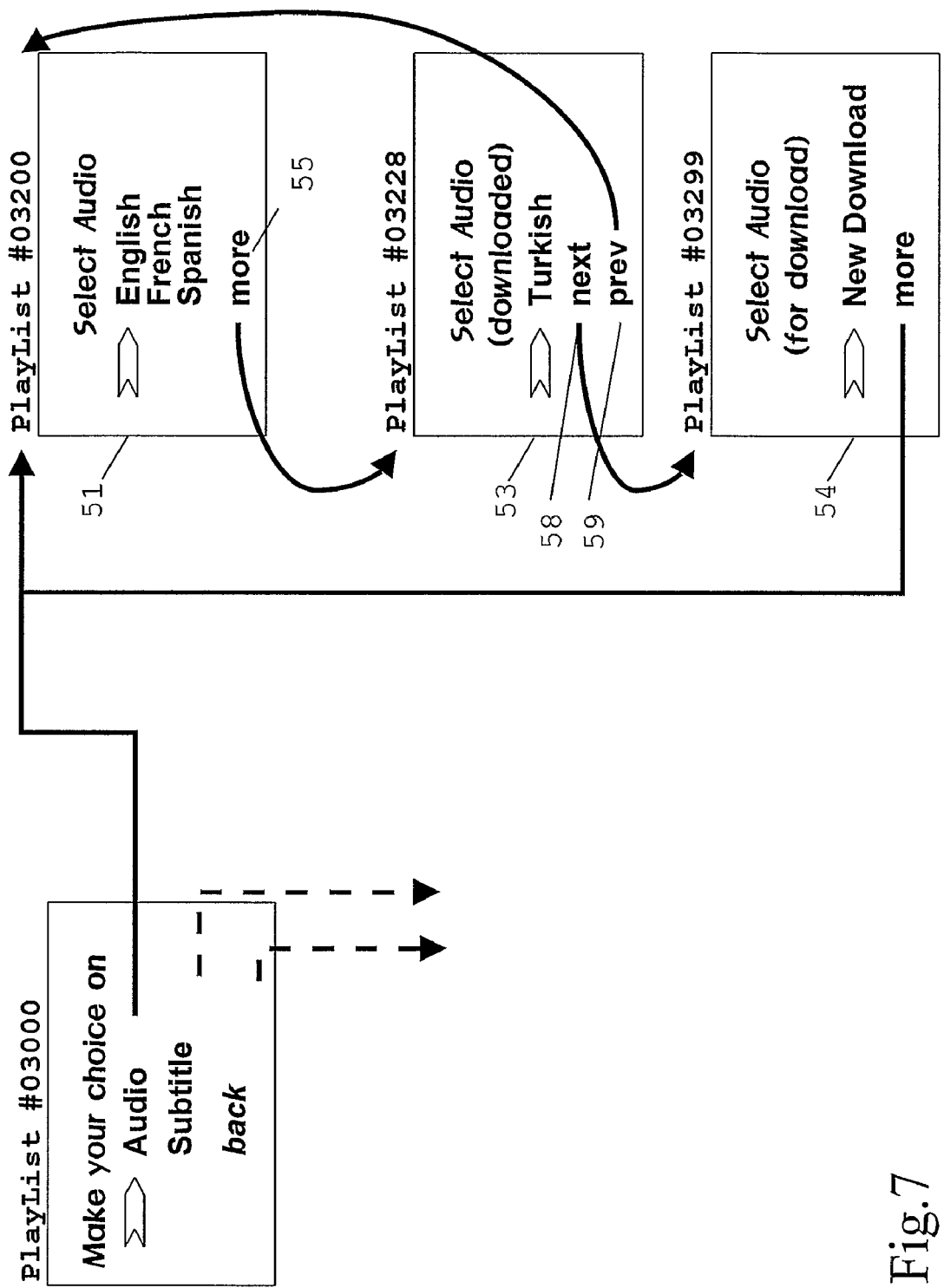
FIG. 7 a scheme of a BD-ROM menu showing the exemplary audio track selection menu as depicted in FIG. 5, after deleting some downloaded supplement data.
Figure 8:
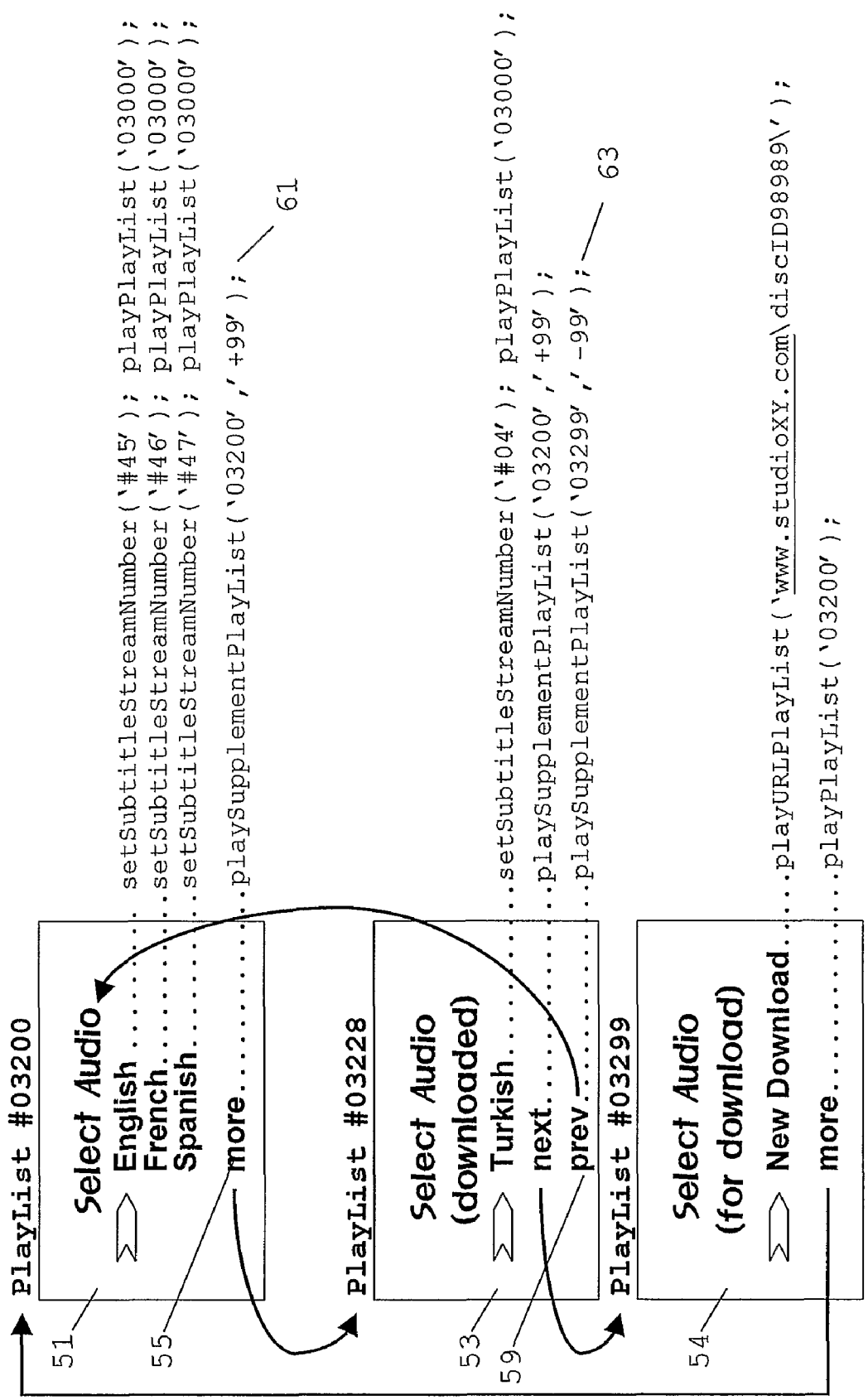
FIG. 8 an excerpt of FIG. 7 showing the commands executed when a menu button is selected and activated.
Figure 9:
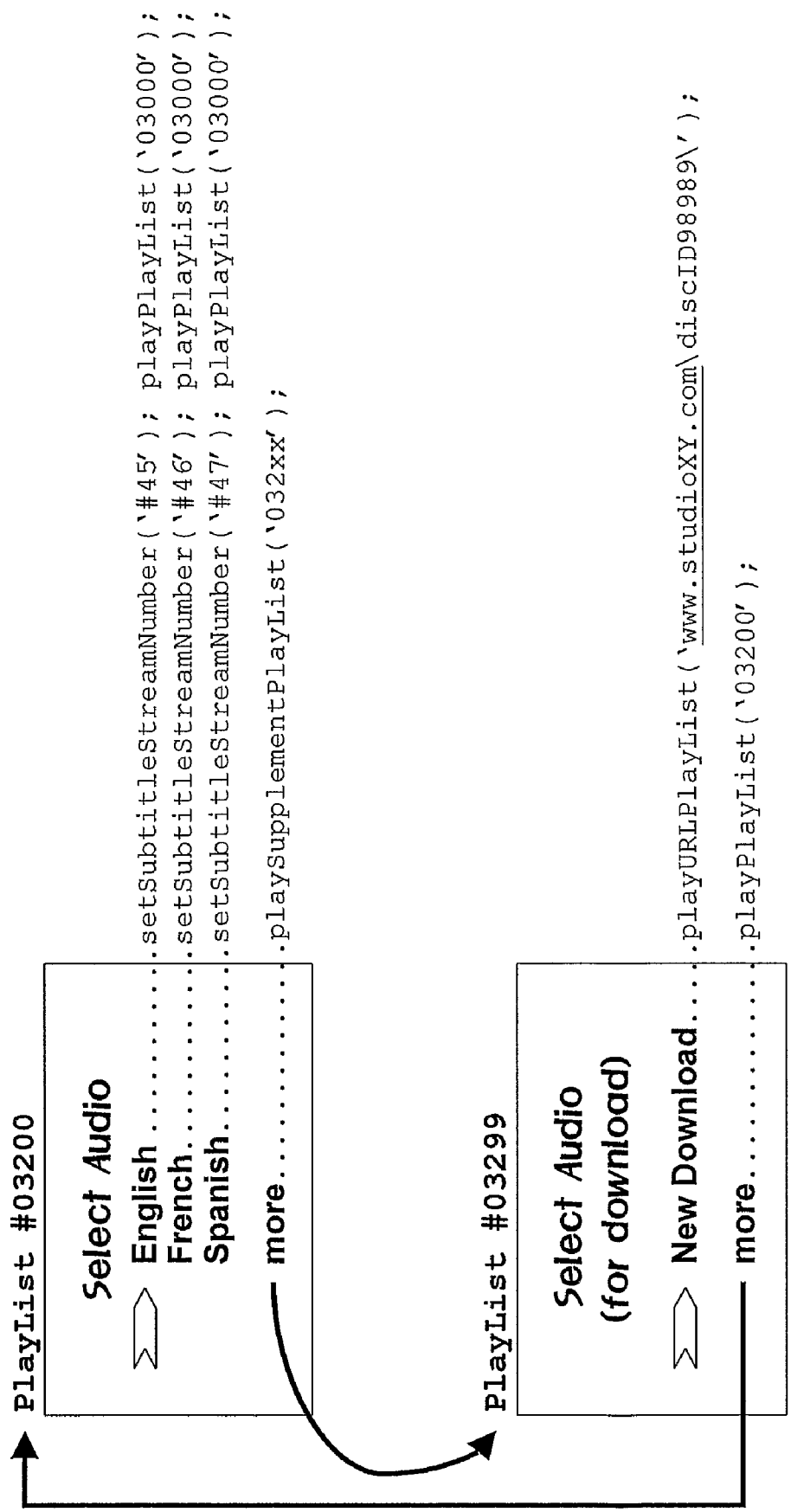
FIG. 9 an excerpt of FIG. 1 showing the commands executed when a menu button is selected and activated, wherein an implicit range link is used and all menus are located on the original BD-ROM disc.

A further advantage of this invention is that by means of the "daisy-chain" link the consistency of the menu with the AV content is kept even when alternative downloads and deletions took place. No presence of an active Internet connection to a server is required to provide this consistency. For further clarification, FIG. 7 and FIG. 8 show a situation where the previously downloaded German audio track has been deleted. This could be done while no server was available to the player device. Nevertheless the "playSupplementPlayList( )" command will cope with the situation by just taking the next playlist/play-item in line.

Assuming that the main audio selection menu page 51 is displayed and the user selects and activates the "more" button 55, a menu controller according to the invention detects that the current menu page number is #03200 and that the "more" button command 61 specifies an ascending range from #03200 to #03299 for the next menu page. Then it detects which menu pages are available within this range, and finds the three pages shown in FIG. 7 and FIG. 8, with the associated page numbers #03200, #03228 and #03299. Starting from the current page number in ascending order, it detects that the next higher page number is #03228, and decodes the respective stream so that finally the contained menu page 53 can be displayed.

When this page 53 is displayed, and the user selects and activates the "prev" button 59, the menu controller starts from the current page number #03228, detects from the button command 63 that, starting from the current page number, the range from #03299 to #03200 must be searched through in descending order, and detects that the next page to be displayed is #03200.

Figure 10:
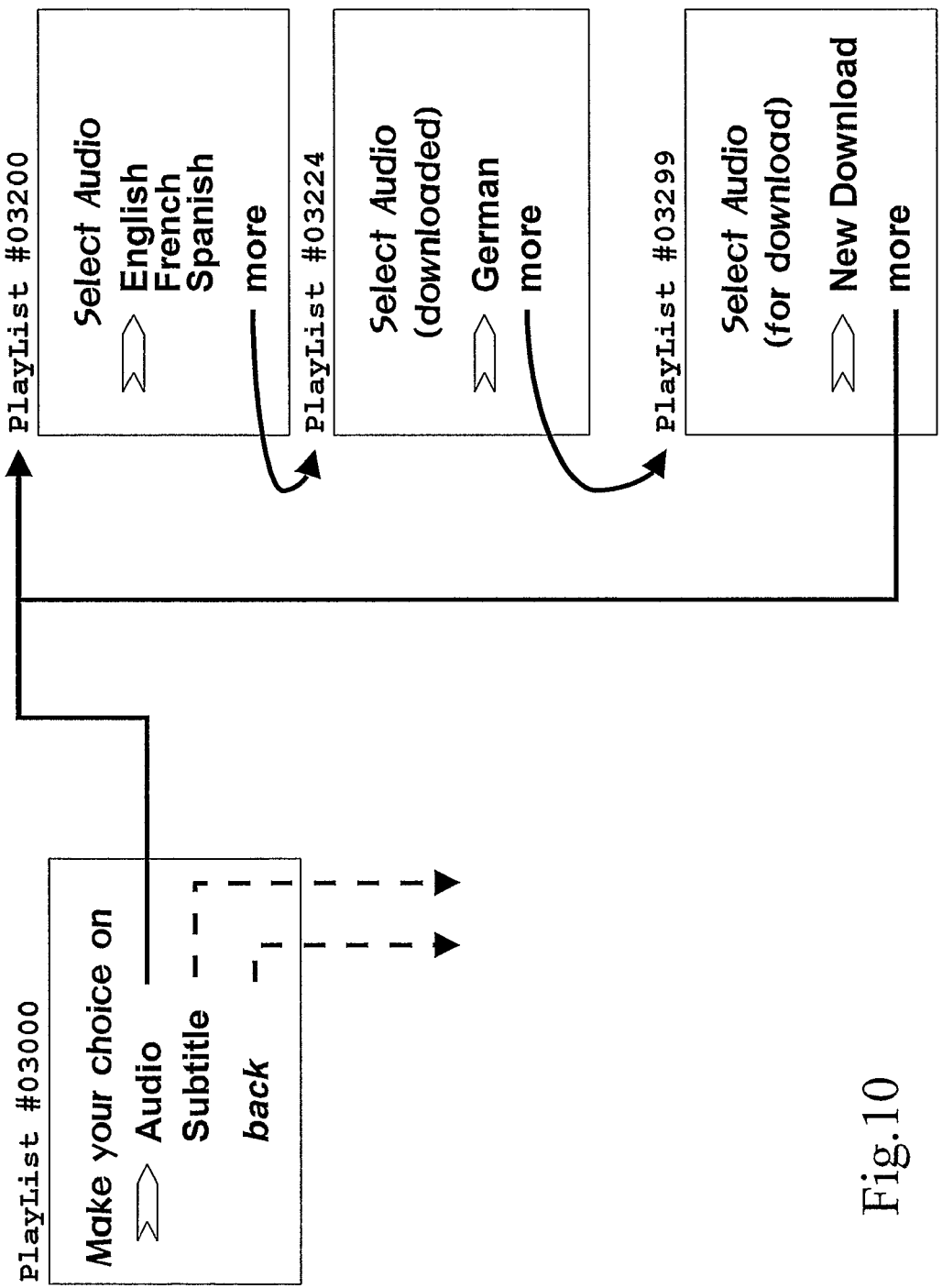
FIG. 10 a scheme of a BD-ROM menu showing the exemplary audio track selection menu, extended by selection menu frames from downloaded supplement data.
Figure 11:
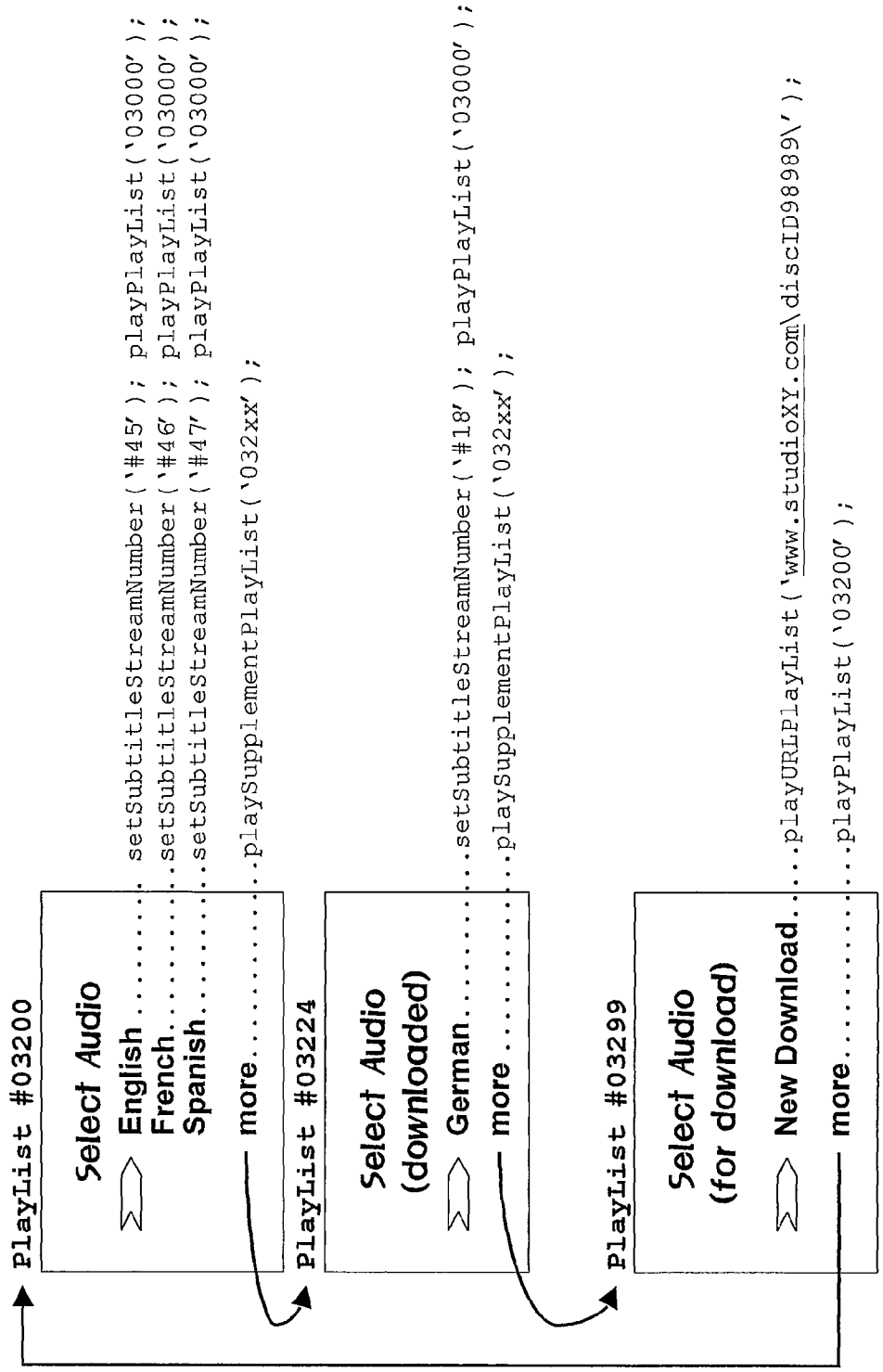
FIG. 11 an excerpt of FIG. 10 showing the commands executed when a menu button is selected and activated.
Figure 12:
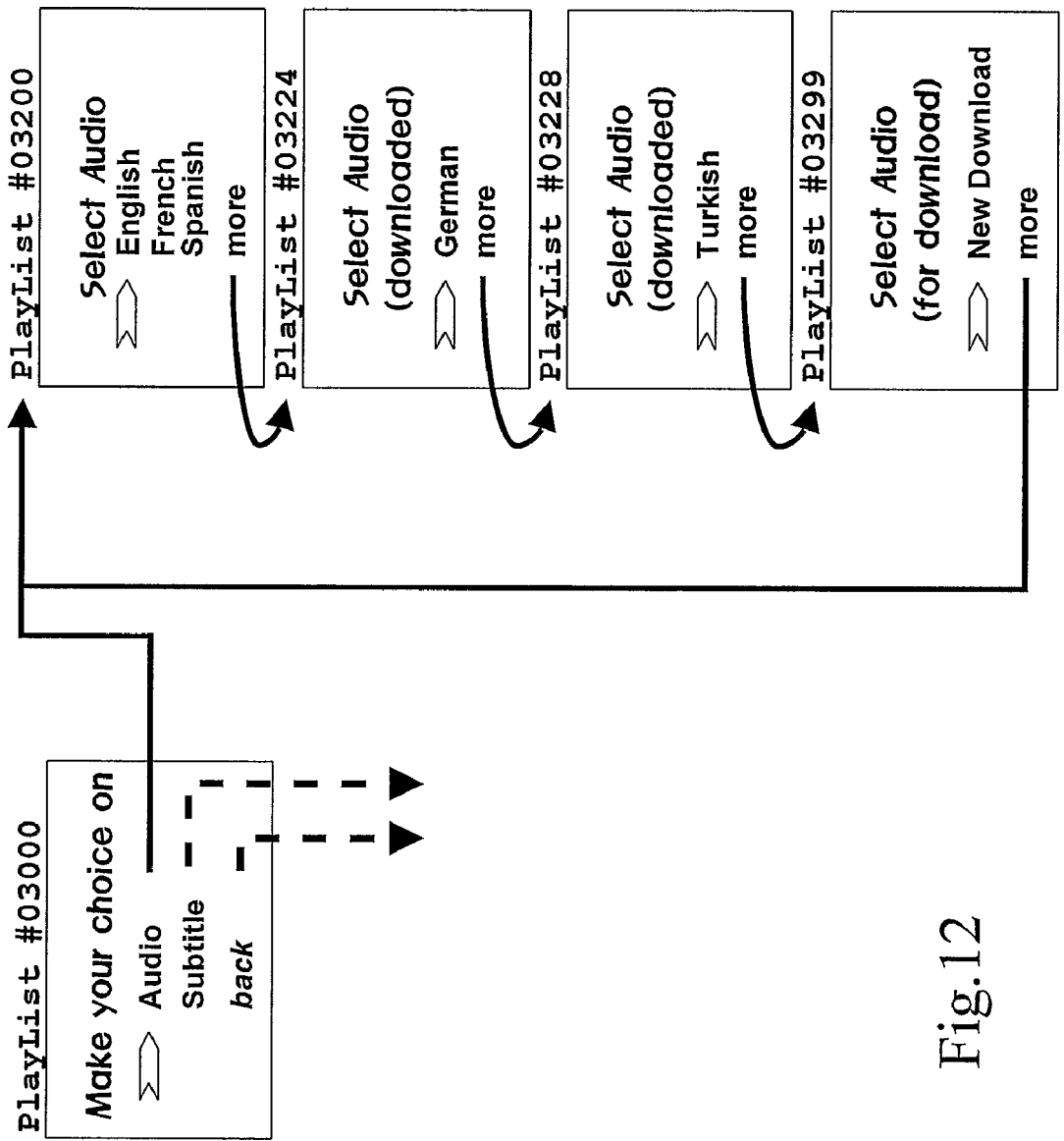
FIG. 12 a scheme of a BD-ROM menu showing the exemplary audio track selection menu depicted in FIG. 10, further extended by selection menu frames from further downloaded supplement data.
Figure 13:
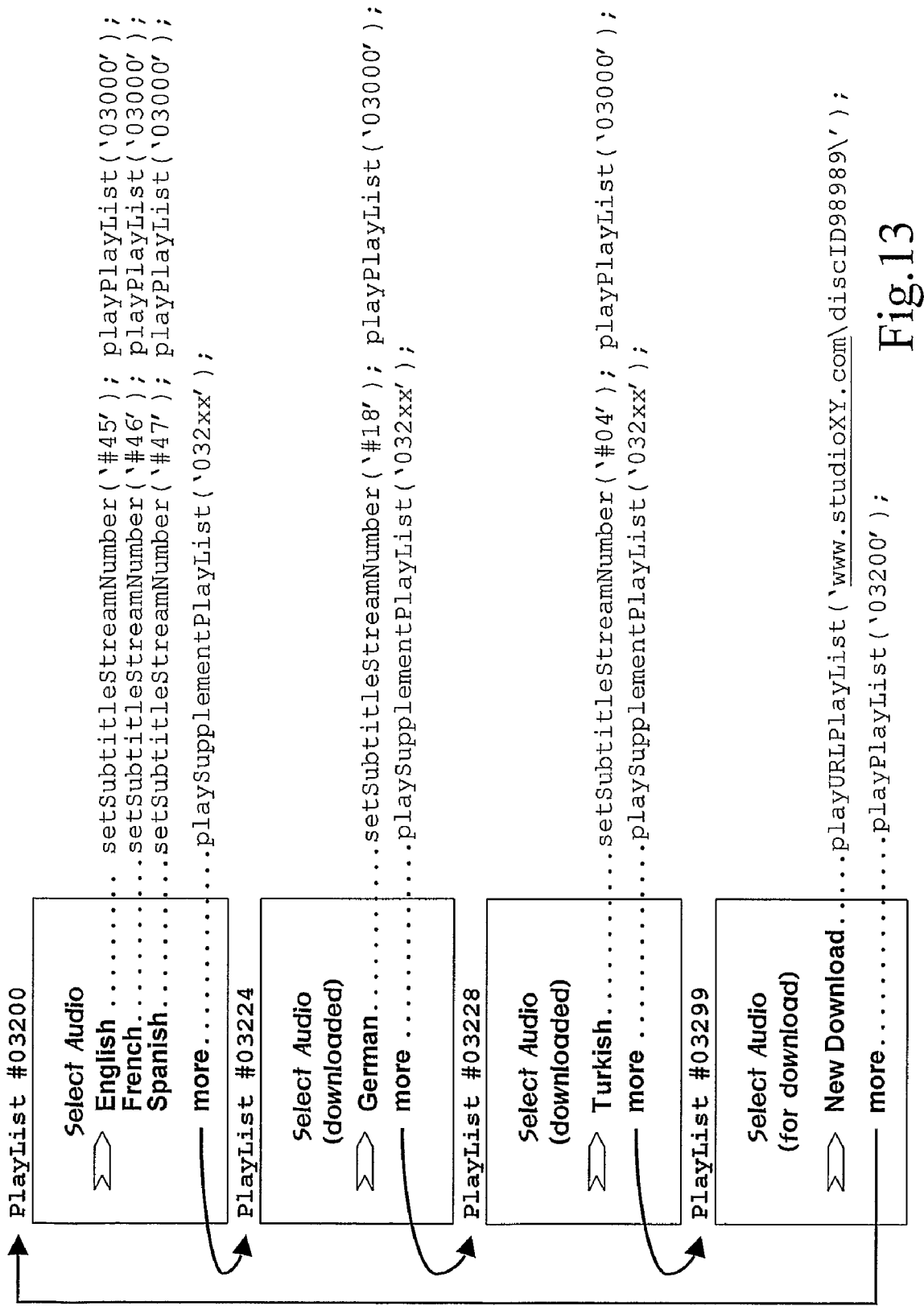
FIG. 13 an excerpt of FIG. 12 showing the commands executed when a menu button is selected and activated.
Figure 14:
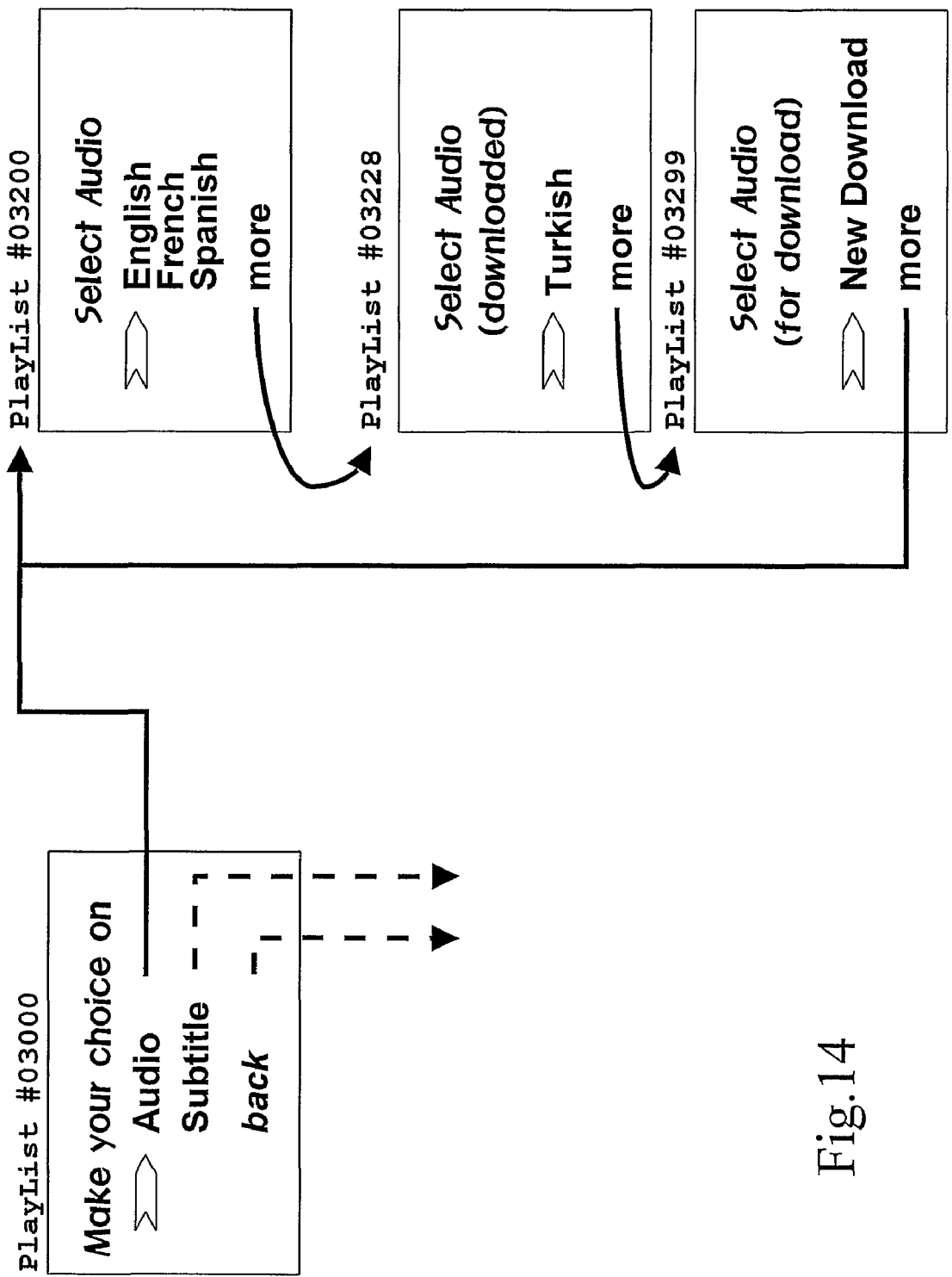
FIG. 14 a scheme of a BD-ROM menu showing the exemplary audio track selection menu as depicted with FIG. 12, after deleting some downloaded supplement data.
Figure 15:
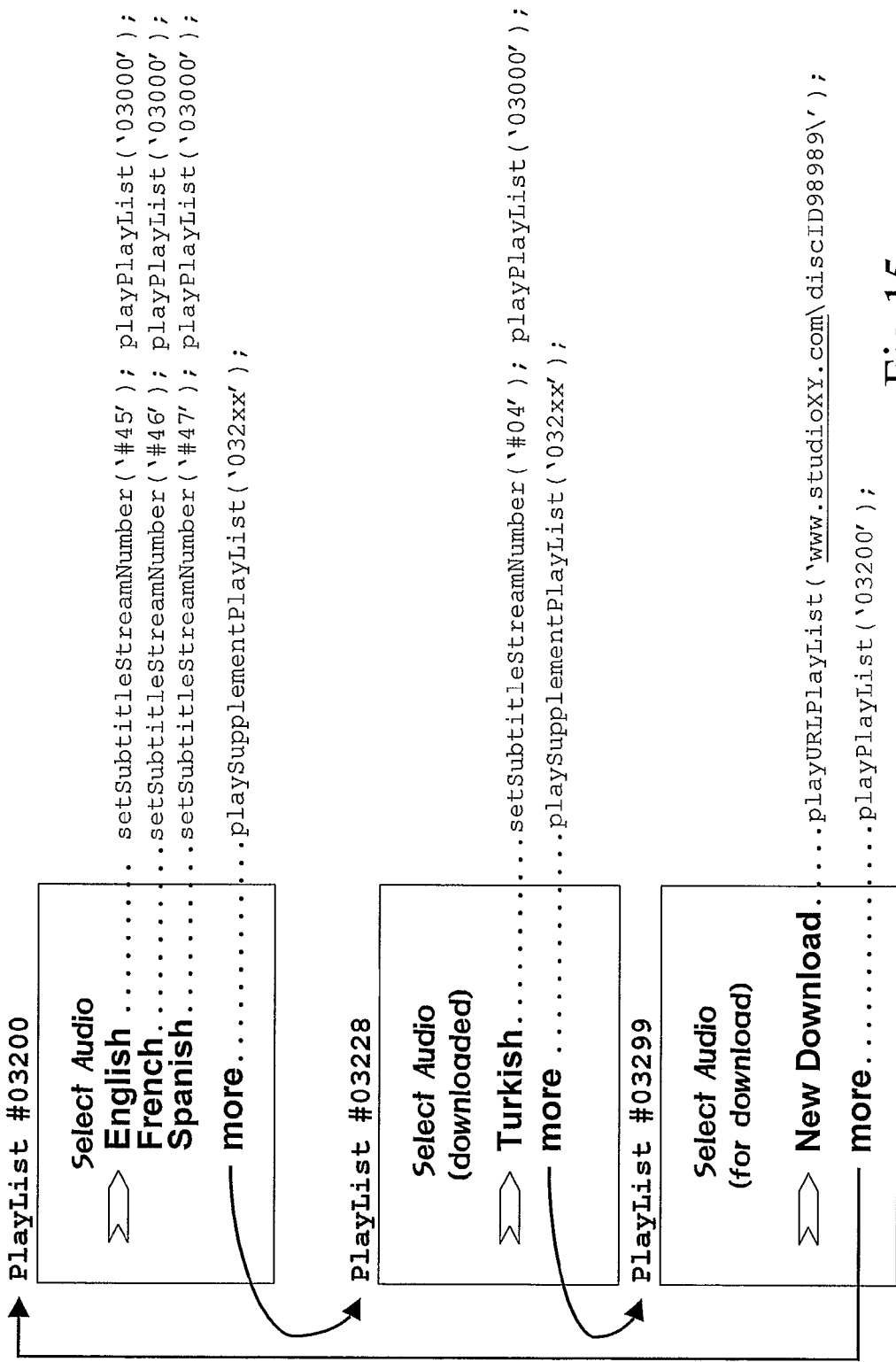
FIG. 15 an excerpt of FIG. 14 showing the commands executed when a menu button is selected and activated.

In the following an alternative embodiment of the range link command is explained. Instead of defining an explicit range by means of a second parameter within the command "playSupplementPlayList('03200', '+99')", it is also possible to define an implicit range within the first parameter e.g. by "playSupplementPlayList('032xx')", as shown in FIG. 10. The range is defined by the two x'es being placeholders. This range definition is less flexible since it is bound to a fixed number of digits. Furthermore there is no possibility to show an upward or downward direction for the range, and the menu frames can be passed through only in one predefined direction, as shown in FIG. 9-FIG. 15 corresponding to FIG. 2-FIG. 8.

Figure 16:
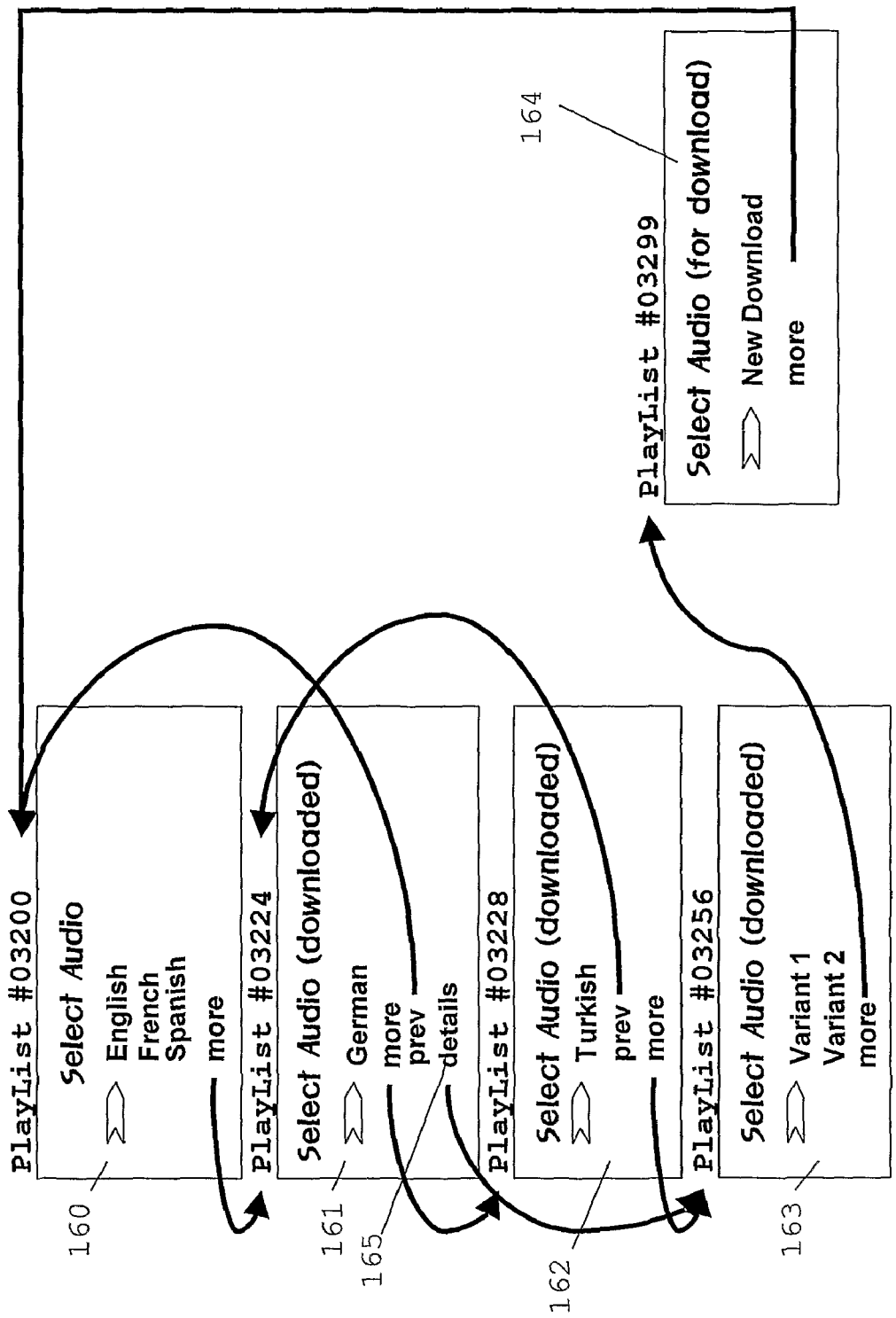
FIG. 16 an example where a range of allowable page numbers in not deduced from the current menu page number.

An example where a range of allowable pages cannot be deduced from the current menu page number is shown in FIG. 16. While the "more" command from an initially available menu page 160 leads to the downloaded menu page with the lowest page number 161, this page has not only "more" and "prev" buttons as described before, but also a "details" button 165. This button may have an associated button command "playSupplementPlayList('#03250', '+49')", defining that the menu pages between the current page and the minimum specified menu page 163 are skipped. While in this case only one menu page 162 is skipped, this mechanism is suitable for constructing complex hierarchical menus.

For detection of the next menu page to be displayed, any known search method may be employed. Only the currently active page number, the allowed range of selectable pages and the search direction must be known. E.g., in one embodiment of the invention a list of several or all of the available menu pages is generated, and the detection of the next menu page to be displayed is based on determining the position of the current menu page on the list and selecting the menu page that corresponds to the next or previous list entry. In another embodiment, the page number of the current menu page is determined and all available other menu pages are searched through to detect the one with the closest higher or lower page number.

In one embodiment the page number of a menu page is not fixed, but depends on user specific settings or a user profile. E.g. such settings or profile can be specified before the supplement data are downloaded, and the file name under which these supplement data are stored depends on these settings. Examples for such settings or profiles are country information, so that the order of additional menu pages depends on a user's country code, medium type information, like special edition media, or player related information defining the player's capabilities. Thus, the same downloaded content like games or movie trailers can refer to more than one medium and therefore the menu pages get special page numbers, or the order of menu pages can depend on the player type or status.

Finally, a range of allowable page numbers may also comprise a single page number. This may be useful in various cases, e.g. for defining a specific sequence of menu pages that have a close relationship to each other.

The invention can be used for all kinds of devices that can combine playback of AV data having associated menu data and coming from two different storage media.

The invention claimed is:

1. A method for automatically generating and dynamically adapting an electronic menu including a plurality of menu pages, wherein said menu pages contain selectable menu items with associated commands to be executed upon activation of the menu items, the method comprising:
associating a page number with each of the menu pages;
a first menu page containing a first menu item with a first associated command, wherein the first associated command is associated with data and comprises switching to another menu page;
determining a range of page numbers based upon the data;
dynamically detecting available menu pages having the range of page numbers, wherein said dynamically detecting is performed each time said first associated command is executed; and
selecting a second menu page upon activation of said first menu item, wherein the second menu page is one of the available menu pages and wherein the first menu page and the second menu page are retrieved from different non-transitory storage media.

2. Method according to claim 1, wherein determining said range of page numbers is also based upon a page number of said first menu page.

3. Method according to claim 2, wherein determining said range is further based on a page number of another menu page that is stored on a same one of said different storage media as the first menu page.

4. Method according to claim 3, wherein said another menu page is, among the menu pages stored on the same one of said different storage media, contiguous to said first menu page, and the page number of said another menu page is not contiguous to the page number of said first menu page.

5. Method according to claim 2, wherein said data comprises a placeholder.

6. Method according to claim 2, wherein said data comprises a numeric value, and wherein the range is determined by the numeric value and the page number of said first menu page, and wherein said second menu page is one of said available menu pages having page numbers greater than the page number of said first menu page, when the numeric value is positive.

7. Method according to claim 2, wherein the page number of the first menu page or the second menu page depends on user specific settings.

8. Method according to claim 2, wherein detecting the available menu pages includes detecting if corresponding AV content selectable from said menu page is also available.

9. Method according to claim 1, wherein determining said range is based on a placeholder within said data.

10. Method according to claim 1, wherein said data contain a numeric value, and wherein determining the range of page numbers is based on the numeric value and a page number of said first menu page, and wherein the second menu page is one of said available menu pages having page numbers greater than the page number of said first menu page, if the numeric value is positive.

11. Method according to claim 10, wherein the second menu page is selected according to a predefined rule, the rule specifying which one of said available menu pages having the page numbers greater than the page number of said first menu page is selected.

12. Method according to claim 1, wherein one of said menu pages is stored in a file, or in a selectable portion of the file, and a page number of said one of said menu pages is determined by a name of the file, or by the name of the file and the selectable portion within the file.

13. Method according to claim 1, wherein the page number of the first menu page or the second menu page depends on user specific settings.

14. Method according to claim 1, wherein detecting the available menu pages includes detecting if corresponding AV content selectable from said available menu pages is also available.

15. An apparatus having software instructions stored on a non-transitory storage medium for automatically generating and dynamically adapting an electronic menu including a plurality of menu pages, wherein each of said menu page contains selectable menu items with associated commands to be executed upon activation of the menu items, wherein the apparatus comprises:
a menu controller for:
detecting a current menu page number of a current menu page displayed;
retrieving from at least two different non-transient storage media menu related data and other data being selectable through the currently displayed menu page;
determining from a request for displaying another menu page an allowed range of page numbers for the another menu page;

dynamically detecting available menu pages having the page numbers within said allowed range, wherein said dynamically detecting is performed responsive to the request for displaying said another menu page each time said request is determined; and selecting said another menu page, wherein said another menu page is one of said available menu pages.

16. Apparatus according to claim 15, wherein determining the allowed range of page numbers comprises comparing a received number with the menu page number of said current menu page, wherein the received number is included within said request.

17. Apparatus according to claim 16, wherein the current menu page is retrieved from a first storage medium of said at least two different storage media, and wherein said determining the allowed range of page numbers further comprises comparing the received number with a menu page number of a further menu page retrieved from said first storage medium, wherein the further menu page is, among the menu pages stored on said first storage medium, contiguous to said first menu page, and the page number of said further menu page is not contiguous to the page number of said first menu page.

* * * * *